US009344545B2

United States Patent
Lo et al.

(10) Patent No.: US 9,344,545 B2
(45) Date of Patent: May 17, 2016

(54) WIRELESS EAR PHONE AND SOUND BROADCASTING METHOD THEREOF

(71) Applicant: Wistron Corporation, New Taipei (TW)

(72) Inventors: Fu-Nen Lo, New Taipei (TW); Chia-Liang Lai, New Taipei (TW); Ping-I Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 62 days.

(21) Appl. No.: 14/174,849

(22) Filed: Feb. 7, 2014

(65) Prior Publication Data

US 2015/0080062 A1 Mar. 19, 2015

(30) Foreign Application Priority Data

Sep. 18, 2013 (TW) ............................. 102133960 A

(51) Int. Cl.
*H04M 1/00* (2006.01)
*H04M 1/60* (2006.01)
*H04R 1/10* (2006.01)
*H04M 1/05* (2006.01)

(52) U.S. Cl.
CPC ........... *H04M 1/6066* (2013.01); *H04R 1/1041* (2013.01); *H04M 1/05* (2013.01); *H04M 2250/12* (2013.01)

(58) Field of Classification Search
CPC ... H04M 1/0258; H04M 1/05; H04M 1/6058; H04M 1/066
USPC ............... 379/428.02, 430; 455/575.6, 575.2, 455/569.1; 381/74, 362, 367, 370; 340/6.1, 340/686.1; 600/519
See application file for complete search history.

(56) References Cited

U.S. PATENT DOCUMENTS

| 7,092,512 B2 * | 8/2006 | Kato et al. ............... 379/387.01 |
| 7,930,007 B2 * | 4/2011 | Andreasson ............... 455/575.2 |
| 8,509,842 B2 * | 8/2013 | Sarin et al. ................. 455/550.1 |

(Continued)

FOREIGN PATENT DOCUMENTS

| CN | 202873023 | 4/2013 |
| TW | 200726297 | 7/2007 |

(Continued)

OTHER PUBLICATIONS

"Office Action of Taiwan Counterpart Application," issued on Nov. 19, 2015, with English translation thereof, p. 1-p. 10.

*Primary Examiner* — Dai A Phuong
(74) *Attorney, Agent, or Firm* — Jianq Chyun IP Office

(57) ABSTRACT

A wireless ear phone and a sound broadcasting method thereof are provided. The wireless ear phone includes a first signal sensor, an electromagnetic signal transmitter, a second signal sensor and a controller. The first signal sensor generates an environment light detection result by detecting an environment light. The electromagnetic signal transmitter transmits an interruptible electromagnetic signal. The second signal sensor is disposed on a transmission path of the interruptible electromagnetic signal, and the second signal sensor generates an electromagnetic signal detection result by detecting whether the interruptible electromagnetic signal or the environment light is received. The controller enables or disables an operation of sound broadcasting of the wireless ear phone according to the electromagnetic signal detection result. When the wireless ear phone is put into an ear of a user, the transmission path is cut-off by the ear of the user.

10 Claims, 3 Drawing Sheets

(56) References Cited

U.S. PATENT DOCUMENTS

| | | | |
|---|---|---|---|
| 2004/0198463 A1* | 10/2004 | Knoedgen | 455/569.1 |
| 2006/0233413 A1 | 10/2006 | Nam | |
| 2007/0219457 A1* | 9/2007 | Lo | 600/519 |
| 2007/0281744 A1* | 12/2007 | Andreasson | 455/557 |
| 2009/0264161 A1* | 10/2009 | Usher | H04M 1/22 455/570 |
| 2009/0312987 A1* | 12/2009 | Uedaira et al. | 702/189 |
| 2010/0109895 A1* | 5/2010 | Rosener | 340/686.1 |
| 2011/0286615 A1* | 11/2011 | Olodort | H04R 1/1025 381/311 |
| 2012/0086551 A1* | 4/2012 | Lowe et al. | 340/6.1 |
| 2012/0289162 A1* | 11/2012 | Hosoi et al. | 455/41.3 |
| 2013/0114825 A1* | 5/2013 | Andreasen | H04R 5/0335 381/74 |
| 2013/0236027 A1* | 9/2013 | Tao et al. | 381/74 |
| 2015/0071456 A1* | 3/2015 | Steenkamp | H04R 1/1008 381/74 |
| 2015/0150469 A1* | 6/2015 | LeBoeuf | A61B 5/0059 600/301 |
| 2015/0227835 A1* | 8/2015 | Rothkopf | G06F 1/1626 706/46 |
| 2015/0331699 A1* | 11/2015 | McKillop | G06F 3/165 710/14 |

FOREIGN PATENT DOCUMENTS

| | | |
|---|---|---|
| TW | M335105 | 6/2008 |
| WO | 2013174324 | 11/2013 |

* cited by examiner

WIRELESS EAR PHONE AND SOUND BROADCASTING METHOD THEREOF

CROSS-REFERENCE TO RELATED APPLICATION

This application claims the priority benefit of Taiwan application serial no. 102133960, filed on Sep. 18, 2013. The entirety of the above-mentioned patent application is hereby incorporated by reference herein and made a part of this specification.

BACKGROUND OF THE INVENTION

1. Field of the Invention

The invention relates to a wireless ear phone, and more particularly to and a sound broadcasting method for the wireless ear phone.

2. Description of Related Art

With rapid advancement of electronic technology, mobile electronic apparatuses have become an important tool in daily lives. In the mobile electronic apparatuses commonly seen on the market, sound information may be played by a wired ear phone or a wireless ear phone. Take a wireless bluetooth ear phone as an example, a user may use the bluetooth ear phone to perform multiple functions including selecting music, dialing a phone call and so on.

In case the user is listening to the music through the bluetooth ear phone, it is quite frequently that the user needs to take off the ear phone in order to handle other tasks when an unexpected situation occurs. In this case, the wireless ear phone of conventional may continue to execute an operation of sound broadcasting since the user may not have time to issue a pause command through the wireless ear phone to stop playing the music. Accordingly, an electrical power of the wireless ear phone may continue to be consumed, resulting unnecessary power consumption. The unnecessary power consumption may also cause a battery in the wireless ear phone to be constantly required for recharging, which leads to an operating life the battery being shortened, and a certain degree of damages to global environment.

SUMMARY OF THE INVENTION

The invention is directed to a wireless ear phone and a sound broadcasting method thereof, in which a power required by the wireless ear phone can be effectively saved.

The wireless ear phone of the invention includes a first signal sensor, an electromagnetic signal transmitter, a second signal sensor and a controller. The first signal sensor generates an environment light detection result by detecting an environment light. The electromagnetic signal transmitter transmits an interruptible electromagnetic signal. The second signal sensor is disposed on a transmission path of the interruptible electromagnetic signal, and the second signal sensor generates an electromagnetic signal detection result by detecting whether the interruptible electromagnetic signal or the environment light is received. The controller is coupled to the second signal sensor. The controller enables or disables an operation of sound broadcasting according to the electromagnetic signal detection result. When the wireless ear phone is put into an ear of a user, the transmission path is cut-off by the ear of the user.

In an embodiment of the invention, the controller is coupled to the first signal sensor and the electromagnetic signal transmitter. The controller controls the electromagnetic signal transmitter to transmit the interruptible electromagnetic signal according to the environment light detection result.

In an embodiment of the invention, when a brightness of the environment light is lower than a preset threshold value, the controller controls the electromagnetic signal transmitter to transmit the interruptible electromagnetic signal according to the environment light detection result.

In an embodiment of the invention, when a brightness of the environment light is not lower than a preset threshold value, the controller controls the electromagnetic signal transmitter to stop transmitting the interruptible electromagnetic signal according to the environment light detection result.

In an embodiment of the invention, the interruptible electromagnetic signal is a visible light, a laser beam or an infrared ray.

In an embodiment of the invention, the controller disables the operation of sound broadcasting of the wireless ear phone according to the electromagnetic signal detection result when the interruptible electromagnetic signal is received by the second signal sensor.

In an embodiment of the invention, the controller enables the operation of sound broadcasting of the wireless ear phone according to the electromagnetic signal detection result when the interruptible electromagnetic signal is not received by the second signal sensor.

In an embodiment of the invention, the wireless ear phone further includes a body part and a protrusion. The body part has a surface, and the protrusion is disposed on the surface of the body part. Therein, the first signal sensor is disposed on the body part; the second signal sensor is disposed on the protrusion; and the electromagnetic signal transmitter is disposed on the surface corresponding to the second signal sensor.

In the invention, a sound broadcasting method for a wireless ear phone includes: generating an environment light detection result by detecting a brightness of an environment light through a first signal sensor; transmitting an interruptible electromagnetic signal through an electromagnetic signal transmitter according to the environment light detection result; generating an electromagnetic signal detection result through a second signal sensor by detecting whether the interruptible electromagnetic signal or the environment light is received; and enabling or disabling an operation of sound broadcasting of the wireless ear phone according to the electromagnetic signal detection result. When the wireless ear phone is put into an ear of a user, the transmission path is cut-off by the ear of the user.

Based on above, in the invention, whether the electromagnetic signal transmitter transmits the interruptible electromagnetic signal is controlled by detecting whether the environment light is received. Next, whether the wireless phone is put into the ear of the user is determined by detecting whether the interruptible electromagnetic signal is cut-off, and served as a basis in determining whether the wireless ear phone is to play sounds. In other words, when the wireless ear phone is not wore by the user, the operation of sound broadcasting can be reliably disabled to prevent unnecessary power consumption, so as to improve a power usage efficiency of the wireless ear phone.

To make the above features and advantages of the disclosure more comprehensible, several embodiments accompanied with drawings are described in detail as follows.

DESCRIPTION OF THE EMBODIMENTS

Figure 1:
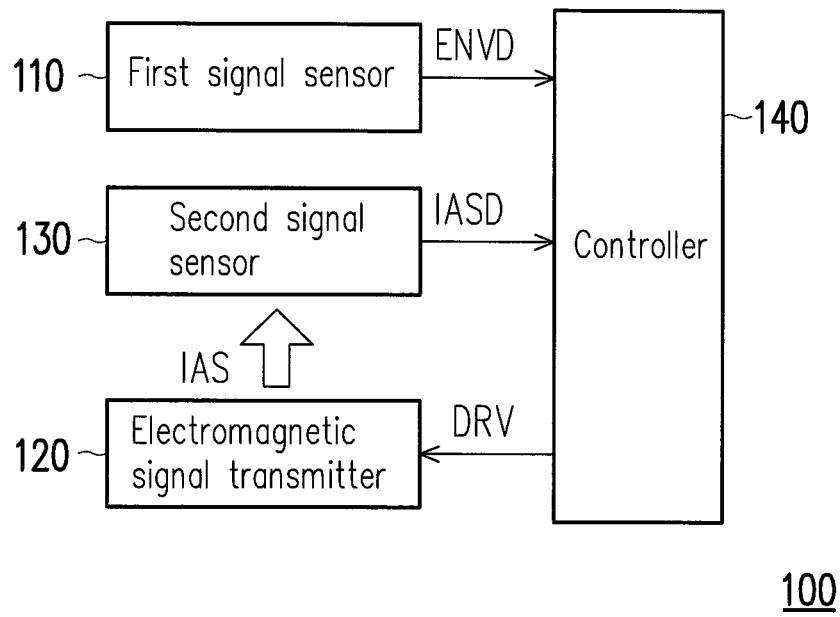
FIG. 1 is a block diagram illustrating a wireless ear phone 100 according to an embodiment of the invention.

Referring to FIG. 1, FIG. 1 is a block diagram illustrating a wireless ear phone 100 according to an embodiment of the invention. The wireless ear phone 100 includes a first signal sensor 110, an electromagnetic signal transmitter 120, a second signal sensor 130 and a controller 140. The wireless ear phone 100 is a bluetooth ear phone for example. The first signal sensor 110 is configured to detect an environment light in an environment where the wireless ear phone 100 is located, and generate an environment light detection result ENVD according to the environment light being detected. The electromagnetic signal transmitter 120 transmits an interruptible electromagnetic signal IAS according to the environment light detection result ENVD obtained by the first signal sensor 110. The second signal sensor 130 is disposed on a transmission path of the interruptible electromagnetic signal IAS. In other words, as long as the transmission path of the interruptible electromagnetic signal IAS is not cut-off by an object, the interruptible electromagnetic signal IAS may be transmitted to the second signal sensor 130. The second signal sensor 130 may detect whether the interruptible electromagnetic signal IAS is received as well as whether the environment light is received. Further, the second signal sensor 130 may generate an electromagnetic signal detection result IASD by detecting whether the environment light or the interruptible electromagnetic signal IAS is received;

The controller 140 is coupled to the first signal sensor 110, the electromagnetic signal transmitter 120 and the second signal sensor 130. Therein, the controller 140 receives the environment light detection result ENVD generated by the first signal sensor 110, and determines whether to drive the electromagnetic signal transmitter 130 to transmit the interruptible electromagnetic signal IAS according to the environment light detection result ENVD being received. More specifically, when a brightness of the environment light is not greater than a preset threshold value being predetermined, the controller 140 may drive the electromagnetic signal transmitter 130 to transmit the interruptible electromagnetic signal IAS according to the environment light detection result ENVD generated by the first signal sensor 110. In contrast, when the brightness of the environment light is greater than the preset threshold value being predetermined, the controller 140 may control the electromagnetic signal transmitter 130 to stop transmitting the interruptible electromagnetic signal IAS according to the environment light detection result ENVD generated by the first signal sensor 110.

The second signal sensor 130 is disposed in the wireless ear phone 100 on a position where the interruptible electromagnetic signal IAS can be received, namely, the transmission path of the interruptible electromagnetic signal IAS. The second signal sensor 130 may generate the electromagnetic signal detection result IASD by detecting whether the environment light or the interruptible electromagnetic signal IAS is received, and transmit the electromagnetic signal detection result IASD to the controller 140.

In view of the foregoing description, it can be known that when the brightness of the environment light is sufficient (greater than the preset threshold value), the second signal sensor 130 may determine whether the wireless ear phone 100 is put into an ear of a user by detecting whether the environment light is received. If the environment light is not received by the second signal sensor 130, it indicates that the second signal sensor 130 also put into the ear along with the wireless ear phone 100. Accordingly, the controller 140 may enable an operation of sound broadcasting of the wireless ear phone 100 according to the electromagnetic signal detection result generated by the second signal sensor 130. In contrast, if the brightness of the environment light is sufficient (greater than the preset threshold value) while the environment light is received by the second signal sensor 130, this indicates that the wireless ear phone 100 is not put into the ear of the user. In this case, the controller 140 may disable the operation of sound broadcasting of the wireless ear phone 100 according to the electromagnetic signal detection result generated by the second signal sensor 130.

In view of above, if the brightness of the environment light is insufficient (not greater than the preset threshold value), the controller 140 may generate a driving signal DRV according to the environment light detection result ENVD generated by the first signal sensor 110, so as to drive the electromagnetic signal transmitter 120 to generate the interruptible electromagnetic signal IAS. Accordingly, the second signal sensor 130 may generate the electromagnetic signal detection result IASD by detecting whether the interruptible electromagnetic signal IAS is received. It should be noted that, when the wireless ear phone 100 is put into the ear of the user, the transmission path of the interruptible electromagnetic signal IAS is interrupted by the ear of the user. Therefore, the second signal sensor 130 is capable of determining whether the wireless ear phone 100 is put into the ear of the user by detecting whether the interruptible electromagnetic signal IAS is received. Accordingly, the controller 140 may enable or disable the operation of sound broadcasting of the wireless ear phone 100 according to the electromagnetic signal detection result IASD generated by the second signal sensor 130. Therein, if electromagnetic signal detection result IASD generated by the second signal sensor 130 indicates that the wireless ear phone 100 is not put into the ear of the user (i.e., the interruptible electromagnetic signal IAS is received by the second signal sensor 130), the controller 140 disables the operation of sound broadcasting of the wireless ear phone 100. In contrast, if electromagnetic signal detection result IASD generated by the second signal sensor 130 indicates that the wireless ear phone 100 is put into the ear of the user (i.e., the interruptible electromagnetic signal IAS is not received by the second signal sensor 130), the controller 140 enables the operation of sound broadcasting of the wireless ear phone 100.

Figure 2:
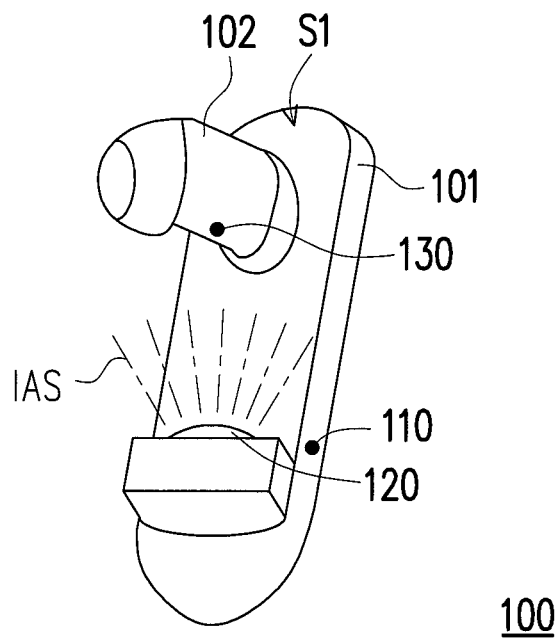
FIG. 2 is a schematic diagram illustrating a structure of the wireless ear phone 100 according to an embodiment of the invention.

Referring to FIG. 1 and FIG. 2 together, FIG. 2 is a schematic diagram illustrating a structure of the wireless ear phone 100 according to an embodiment of the invention. The wireless ear phone 100 includes a body part 101 and a protrusion 102. The body part 101 has a surface S1, and the protrusion 102 is disposed on the surface S1 top be in contact with the body part 101. The protrusion 102 is configured to be put into the ear of the user, and to transmit sounds to the ear of the user.

It should be note that, the first signal sensor 110 may be disposed on the body part 101 of the wireless ear phone 100 on any portions where the environment light can be detected. The second signal sensor 130 is disposed on the protrusion 102 of the wireless ear phone 100, and the electromagnetic signal transmitter 120 is disposed on the body part 101 corresponding to the second signal sensor 130.

In view of FIG. 2, when the second signal sensor 130 is put into the ear of the user along with the protrusion 102, the transmission path for the electromagnetic signal transmitter 120 to transmit the interruptible electromagnetic signal IAS is cut-off by the ear of the user. Therefore, the electromagnetic signal detection result indicating whether the interruptible electromagnetic signal IAS is received by the second signal sensor 130 can serve as a basis in detecting whether the wireless ear phone 100 is put into the ear of the user.

In addition, the electromagnetic signal transmitter 120 depicted in FIG. 2 can be a light-emitting diode configured to generate the interruptible electromagnetic signal IAS in form of a visible light. Naturally, the electromagnetic signal transmitter 120 may also be other apparatuses capable of transmitting the interruptible electromagnetic signal which can be cut-off by the ear of the user, such as an infrared transmitter or a laser beam transmitter.

Figure 3:
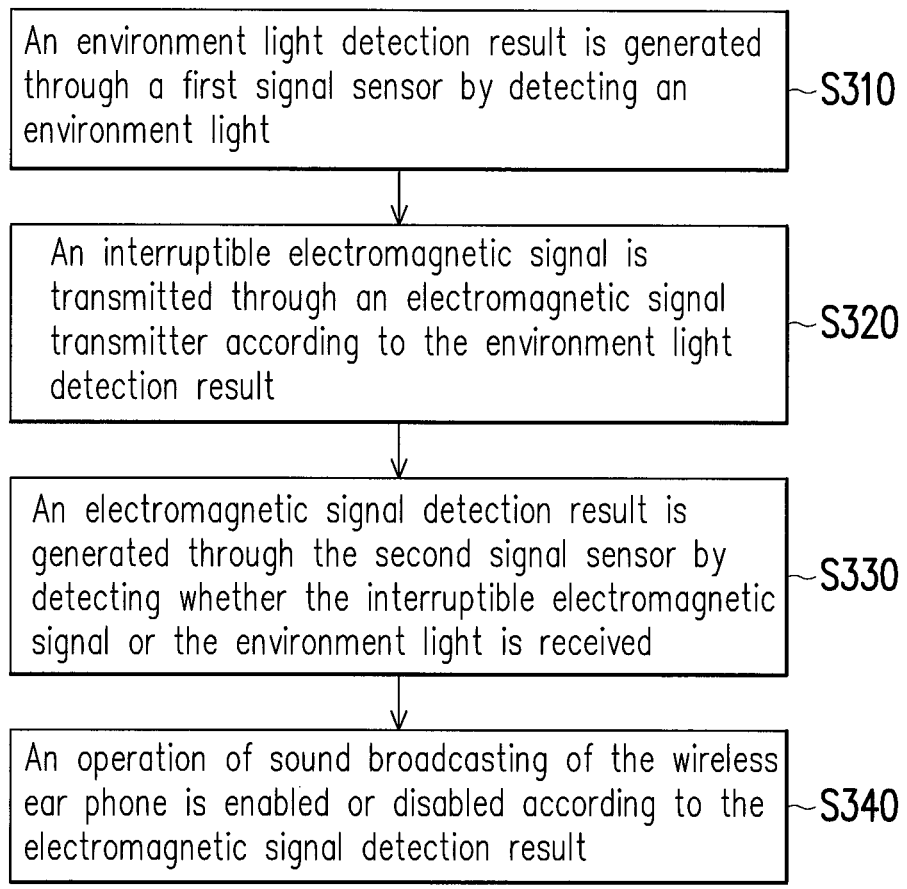
FIG. 3 is a flowchart illustrating a sound broadcasting method for a wireless ear phone according to an embodiment of the invention.

Referring to FIG. 3, FIG. 3 is a flowchart illustrating a sound broadcasting method for a wireless ear phone according to an embodiment of the invention. In step S310, an environment light detection result is generated through a first signal sensor by detecting an environment light. Next, in step S320, an interruptible electromagnetic signal is transmitted through an electromagnetic signal transmitter according to the environment light detection result, and the interruptible electromagnetic signal is then transmitted to a second signal sensor. In step S330, an electromagnetic signal detection result is generated through the second signal sensor by detecting whether the interruptible electromagnetic signal or the environment light is received. Therein, step S330 is used as a basis in determining whether a wireless ear phone is put into an ear of a user. When a brightness of the environment light is greater than a preset threshold value, the second signal sensor may determine whether the wireless ear phone is put into the ear of the user by detecting whether the environment light is received. When the brightness of the environment light is not greater than the preset threshold value, the second signal sensor may determine whether the wireless ear phone is put into the ear of the user by detecting whether the interruptible electromagnetic signal is received. Lastly, in step S340, an operation of sound broadcasting of the wireless ear phone is enabled or disabled according to the electromagnetic signal detection result.

Relevant implementation detail for the steps above has been described in the previous embodiments and implementations, thus it is omitted hereinafter.

Figure 4:
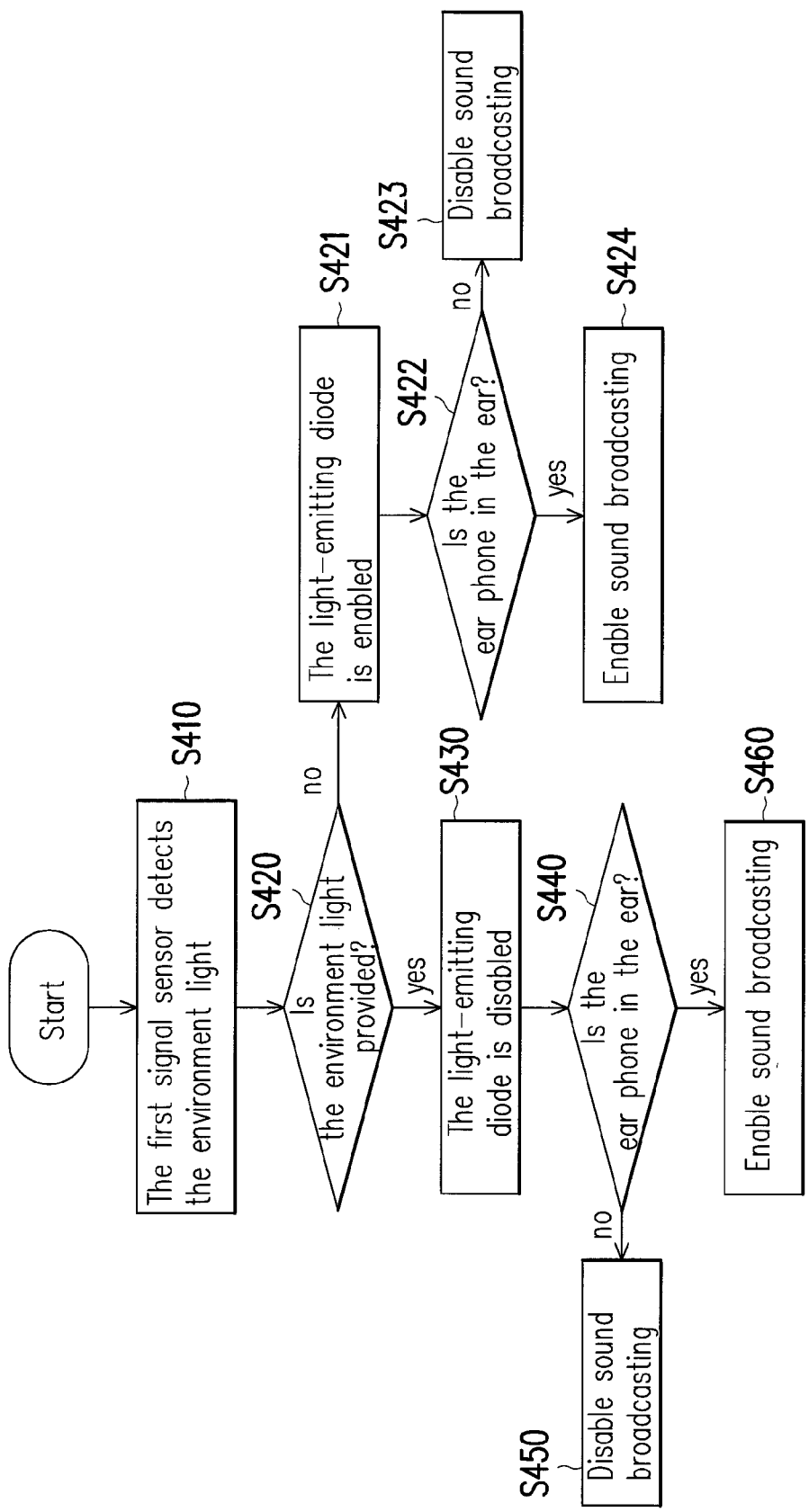
FIG. 4 is a flowchart illustrating an implementation of the sound broadcasting method for the wireless ear phone according to an embodiment of the invention.

Referring to FIG. 4, FIG. 4 is a flowchart illustrating an implementation of the sound broadcasting method for the wireless ear phone according to an embodiment of the invention. In step S410, the environment light is detected through the first signal sensor. Next, in step S420, whether the environment light is detected is determined, and if the environment light is not detected by the first signal sensor, proceeding to step S421 in which the light-emitting diode is enabled. In contrast, if the environment light is detected by the first signal sensor in step S420, proceeding to step S430 in which the light-emitting diode is disabled.

After the light-emitting diode is enabled in step S421, it is then determined whether the wireless ear phone is put into the ear of the user in step S422. More specifically, whether the visible light emitted by the light-emitting diode is received by the second signal sensor is determined in said step. If the visible light emitted by the light-emitting diode is received by the second signal sensor, it indicates that the wireless ear phone is not put into the ear of the user, thus, proceeding the step S423 in which the operation of the sound broadcasting is disabled. In contrast, if the visible light emitted by the light-emitting diode is not received by the second signal sensor, it indicates that the wireless ear phone is put into the ear of the user, thus, proceeding the step S424 in which the operation of the sound broadcasting is enabled.

In addition, after step S430, it is determined whether the wireless ear phone is put into the ear of the user in step S440. Therein, the second signal sensor may determine whether the wireless ear phone is put into the ear of the user by detecting whether the environment light is received. More specifically, if it is detected that the environment light is received by the second signal sensor, it indicates that the wireless ear phone is not put into the ear of the user, thus, proceeding to step S450 in which the operation of sound broadcasting is disabled. In contrast, if it is detected that the environment light is not received by the second signal sensor, it indicates that the wireless ear phone is put into the ear of the user, thus, proceeding to step S440 in which the operation of sound broadcasting is enabled.

In summary, in the invention, the environment light is detected by using the first signal sensor, and the interruptible electromagnetic signal is transmitted according to the environment light detection result. Accordingly, with the wireless ear phone of the invention, whether the wireless ear phone is put into the ear of the user can be determined by detecting whether the environment light or the interruptible electromagnetic signal is received by the first signal sensor in terms of indoor, outdoor, day or night environments. Accordingly, when taking off the wireless ear phone from the ear of the user, the operation of sound broadcasting can be accurately and correctly disabled. As a result, the unnecessary power consumption possibly caused the wireless ear phone can be prevented, so as to improve an overall performance of the wireless ear phone.

What is claimed is:

1. A wireless ear phone, comprising:
  a first signal sensor configured to generate an environment light detection result by detecting an environment light;
  an electromagnetic signal transmitter configured to generate an interruptible electromagnetic signal according to the environment light detection result;
  a second signal sensor disposed on a transmission path of the interruptible electromagnetic signal, and configured to generate an electromagnetic signal detection result by detecting whether the interruptible electromagnetic signal or the environment light is received; and
  a controller coupled to the second signal sensor, and configured to enable or disable an operation of sound broadcasting of the wireless ear phone according to the electromagnetic signal detection result,
  wherein when the wireless ear phone is put into an ear of a user, the transmission path is cut-off by the ear of the user and a path for the first light sensor receiving the environment light is not cut-off,
  wherein the controller is coupled to the first signal sensor and the electromagnetic signal transmitter, and the controller controls the electromagnetic signal transmitter to transmit the interruptible electromagnetic signal according to the environment light detection result,
  wherein when a brightness of the environment light is lower than a preset threshold value, the controller controls the electromagnetic signal transmitter to transmit the interruptible electromagnetic signal according to the environment light detection result.

2. The wireless ear phone of claim 1, wherein when the brightness of the environment light is not lower than the preset threshold value, the controller controls the electromagnetic signal transmitter to stop transmitting the interruptible electromagnetic signal according to the environment light detection result.

3. The wireless ear phone of claim 1, wherein the interruptible electromagnetic signal is a visible light, a laser beam or an infrared ray.

4. The wireless ear phone of claim 1, wherein the controller enables the operation of sound broadcasting of the wireless ear phone according to the electromagnetic signal detection result when the interruptible electromagnetic signal and the environment light are not received by the second signal sensor.

5. The wireless ear phone of claim 1, wherein the controller disables the operation of sound broadcasting of the wireless ear phone according to the electromagnetic signal detection result when the interruptible electromagnetic signal or the environment light is received by the second signal sensor.

6. The wireless ear phone of claim 1, further comprising:
 a body part having a surface; and
 a protrusion disposed on the surface,
  wherein the first signal sensor being disposed on the body part, the second signal sensor being disposed on the protrusion, and the electromagnetic signal transmitter being disposed on the surface corresponding to the second signal sensor.

7. A sound broadcasting method for a wireless ear phone, comprising:
 generating an environment light detection result by detecting an environment light through a first signal sensor;
 transmitting an interruptible electromagnetic signal through an electromagnetic signal transmitter according to the environment light detection result;
 generating an electromagnetic signal detection result through a second signal sensor by detecting whether the interruptible electromagnetic signal or the environment light is received;
 enabling or disabling an operation of sound broadcasting of the wireless ear phone according to the electromagnetic signal detection result,
 wherein when the wireless ear phone is put into an ear of a user, the transmission path is cut-off by the ear of the user and a path for the first light sensor receiving the environment light is not cut-off,
 wherein transmitting the interruptible electromagnetic signal through the electromagnetic signal transmitter according to the environment light detection result comprises:
  when a brightness of the environment light is lower than a preset threshold value, controlling the electromagnetic signal transmitter through the controller to transmit the interruptible electromagnetic signal according to the environment light detection result.

8. The sound broadcasting method for the wireless ear phone of claim 7, wherein transmitting the interruptible electromagnetic signal through the electromagnetic signal transmitter according to the environment light detection result comprises:
  when the brightness of the environment light is not lower than the preset threshold value, controlling the electromagnetic signal transmitter through the controller to stop transmitting the interruptible electromagnetic signal according to the environment light detection result.

9. The sound broadcasting method for the wireless ear phone of claim 7, wherein enabling or disabling the operation of sound broadcasting of the wireless ear phone according to the electromagnetic signal detection result comprises:
  enabling the operation of sound broadcasting of the wireless ear phone according to the electromagnetic signal detection result when the interruptible electromagnetic signal and the environment light are not received by the second signal sensor.

10. The sound broadcasting method for the wireless ear phone of claim 7, wherein enabling or disabling the operation of sound broadcasting of the wireless ear phone according to the electromagnetic signal detection result comprises:
  disabling the operation of sound broadcasting of the wireless ear phone according to the electromagnetic signal detection result when the interruptible electromagnetic signal or the environment light is received by the second signal sensor.

* * * * *